United States Patent
Centonza et al.

(10) Patent No.: US 11,240,828 B2
(45) Date of Patent: *Feb. 1, 2022

(54) METHODS FOR ADAPTING OVER-THE-AIR SYNCHRONIZATION TO RADIO CONDITIONS

(71) Applicant: Telefonaktiebolaget LM Ericsson (publ), Stockholm (SE)

(72) Inventors: Angelo Centonza, Stockholm (SE); Havish Koorapaty, Saratoga, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 23 days.

This patent is subject to a terminal disclaimer.

(21) Appl. No.: 16/793,321

(22) Filed: Feb. 18, 2020

(65) Prior Publication Data

US 2020/0187224 A1 Jun. 11, 2020

Related U.S. Application Data

(63) Continuation of application No. 16/156,037, filed on Oct. 10, 2018, now Pat. No. 10,609,720, which is a
(Continued)

(51) Int. Cl.
*H04W 72/12* (2009.01)
*H04W 72/00* (2009.01)
(Continued)

(52) U.S. Cl.
CPC ...... *H04W 72/1231* (2013.01); *H04B 7/2687* (2013.01); *H04L 5/00* (2013.01);
(Continued)

(58) Field of Classification Search
CPC ...... H04B 7/2687–2696; H04L 5/0048; H04L 5/005; H04L 5/0051; H04L 5/0073; H04W 56/001; H04W 56/0015; H04W 56/002
See application file for complete search history.

(56) References Cited

U.S. PATENT DOCUMENTS 9,213,080 B2   12/2015   Siomina et al.
9,253,651 B2   2/2016    Palanki et al.
(Continued)

OTHER PUBLICATIONS

"3GPP TS 36.413 V12.2.0", 3rd Generation Partnership Project; Technical Specification Group Radio Access Network; Evolved Universal Terrestrial Radio Access Network (E-UTRAN); S1 Application Protocol (S1AP) (Release 12), Jun. 2014, pp. 1-285.

"3GPP TS 36.423 V12.2.0", 3rd Generation Partnership Project; Technical Specification Group Radio Access Network Evolved Universal Terrestrial Radio Access Network (E-UTRAN); X2 application protocol (X2AP) (Release 12), Jun. 2014, pp. 1-151.

(Continued)

*Primary Examiner* — Pao Sinkantarakorn
(74) *Attorney, Agent, or Firm* — Murphy, Bilak & Homiller, PLLC

(57) ABSTRACT

Embodiments include methods, in a base station operating in a wireless communications network, for over-the-air synchronization with a cell served by a further base station. Such methods include receiving time synchronization information and muting availability information associated with a plurality of further base stations serving a plurality of cells. Such methods also include determining that a cell served by a first further base station is a preferred synchronization source cell for the base station, and sending, to one or more second further base stations, respective requests to activate muting in one or more of the cells served by the second further base stations. Embodiments include complementary methods performed by a further base station, and base stations configured to perform operations corresponding to the exemplary methods.

21 Claims, 12 Drawing Sheets

Related U.S. Application Data continuation of application No. 14/902,280, filed as application No. PCT/SE2015/050836 on Jul. 29, 2015, now Pat. No. 10,136,448.

(60) Provisional application No. 62/030,398, filed on Jul. 29, 2014.

(51) Int. Cl.

| | | |
|---|---|---|
| *H04B 7/26* | (2006.01) | |
| *H04W 48/00* | (2009.01) | |
| *H04W 56/00* | (2009.01) | |
| *H04L 5/00* | (2006.01) | |
| *H04W 92/20* | (2009.01) | |

(52) U.S. Cl.
CPC .......... *H04L 5/0048* (2013.01); *H04L 5/0073* (2013.01); *H04W 48/00* (2013.01); *H04W 56/001* (2013.01); *H04W 56/002* (2013.01); *H04W 72/00* (2013.01); *H04W 92/20* (2013.01)

(56) References Cited

U.S. PATENT DOCUMENTS

| | | |
|---|---|---|
| 9,313,783 B2 | 4/2016 | Zhu |
| 2009/0201838 A1 | 8/2009 | Zhang et al. |
| 2010/0278132 A1 | 11/2010 | Palanki et al. |
| 2011/0300807 A1 | 12/2011 | Kwun et al. |
| 2012/0264441 A1* | 10/2012 | Chandrasekhar ..... H04L 5/0073 455/450 |
| 2012/0315859 A1 | 12/2012 | Lee et al. |
| 2013/0040673 A1 | 2/2013 | Siomina et al. |
| 2014/0016536 A1 | 1/2014 | Zhu et al. |
| 2016/0157197 A1* | 6/2016 | Takeda ................ H04W 16/32 370/350 |
| 2016/0192304 A1* | 6/2016 | Yi ....................... H04B 7/2696 370/311 |
| 2016/0278101 A1* | 9/2016 | Soldati ............... H04W 52/243 |
| 2017/0055237 A1* | 2/2017 | Byun ................ H04W 56/0015 |

OTHER PUBLICATIONS

"Discussion and way forward on Radio Interface Based Synchronisation", Ericsson, 3GPP TSG-RAN3 Meeting #84, R3-141906, Dresden, Germany, Aug. 18-22, 2014, pp. 1-6.

"Discussion on How to Support RIBS", 3GPP TSG-RAN3 Meeting #84, R3-141214, Seoul, Korea, May 19-23, 2014, pp. 1-6.

"LS on Radio Interface based Synchronization", 3GPP TSG RAN WG1 Meeting #77, R1-142762, Seoul, Korea, May 19-23, 2014, p. 1.

"LS on Status of Radio-Interference based Synchronization", 3GPP TSG RAN WG3 Meeting #94, R3-140997, Seoul, Korea, May 19-23, 2014, pp. 1-2.

* cited by examiner

METHODS FOR ADAPTING OVER-THE-AIR SYNCHRONIZATION TO RADIO CONDITIONS

RELATED APPLICATIONS

The present application claims priority to, and is a continuation of, U.S. application Ser. No. 16/156,037 filed Oct. 10, 2018, which is a continuation of U.S. application Ser. No. 14/902,280 filed Dec. 30, 2015, which is a national-stage entry of International App. PCT/SE2015/050836 filed Jul. 29, 2015, which claims benefit of U.S. Provisional Application 62/030,398 filed Jul. 29, 2014. The entire content of these applications are incorporated by reference herein for all purposes.

TECHNICAL FIELD

The present disclosure relates generally to wireless communication systems, and more specifically relates to techniques for reducing interference to reference signals used for synchronization procedures.

BACKGROUND

The 3rd Generation Partnership Project (3GPP) is responsible for the standardization of the Universal Mobile Telecommunication System (UMTS) and the fourth-generation wireless system commonly known as Long Term Evolution (LTE). The 3GPP work on LTE is also referred to as Evolved Universal Terrestrial Radio Access Network (E-UTRAN). LTE is a technology for realizing high-speed packet-based communication that can reach high data rates both in the downlink (the link carrying transmissions from the base station to a mobile station) and in the uplink (the link carrying transmissions from a mobile station to the base station), and is thought of as a next-generation mobile communication system relative to UMTS. In order to support high data rates, LTE allows for a system bandwidth of 20 MHz, or up to 100 MHz when carrier aggregation is employed. LTE is also able to operate in several different frequency bands and can operate in at least Frequency-Division Duplex (FDD) and Time-Division Duplex (TDD) modes.

In LTE mobile broadband wireless communication systems, transmissions from base stations (referred to in 3GPP documentation as eNBs) to mobile stations (referred to as user equipment, or UEs) are sent using orthogonal frequency-division multiplexing (OFDM). OFDM splits the signal into multiple parallel sub-carriers in frequency. FIG. 1 illustrates the LTE downlink physical resource. The basic unit of transmission in LTE is a resource block (RB), which in its most common configuration consists of twelve sub-carriers and seven OFDM symbols. The time interval of seven OFDM symbols is referred to as a "slot." A unit of one subcarrier and one OFDM symbol is referred to as a resource element (RE), which can carry a modulated data symbol. Thus, an RB consists of 84 REs.

FIG. 2 illustrates the downlink subframe in LTE. An LTE radio subframe is composed of two slots in time and multiple resource blocks in frequency, with the number of RBs determining the bandwidth of the system. Furthermore, the two RBs in a subframe that are adjacent in time are denoted an RB pair. Currently, LTE supports standard bandwidth sizes of 6, 15, 25, 50, 75 and 100 RB pairs.

In the time domain, LTE downlink transmissions are organized into radio frames of 10 milliseconds, each radio frame consisting of ten equally-sized subframes of length Tsubframe=1 millisecond.

The signal transmitted by an eNB in a downlink subframe may be transmitted from multiple antennas, and the signal may be received at a UE that has multiple antennas. The radio channel distorts the signals transmitted from each of the multiple antenna ports. In order to demodulate any transmissions on the downlink, a UE thus relies on reference symbols (RS) that are transmitted on the downlink. These reference symbols and their positions in the time-frequency grid are known to the UE and can be used to determine channel estimates by measuring the effect of the radio channel on these symbols. As of Release 11 of the 3GPP specifications for LTE, there are multiple types of reference symbols. One important type is the common reference symbols (CRS), which are used for channel estimation during demodulation of control and data messages. The CRS are also used by the UE for synchronization, i.e., to align the UE's timing with the downlink signal as received from the eNB. The CRS occur once every subframe.

A key improvement to conventional cellular network deployments involves the deployment of relatively low-power "small cells" so as to overlay a conventional arrangement of co-called "macro cells." The result is often referred to as a "heterogeneous network." Heterogeneous networks, where the macro cells and the small cells have vastly different transmit powers, may be deployed in two main ways. In the first deployment type, the small cell layer and the macro cell layer share the same carrier frequencies. This approach creates interference between the two layers. In the second deployment type, the small cell layer and macro cell layer are on separate frequencies.

The network architecture for LTE allows messages to be sent between eNBs via an X2 interface. The eNB also can communicate with other nodes in the network, e.g., to the Mobility Management Entity (MME) via the S1 interface. In FIG. 3, the architecture involving E-UTRAN, i.e., the radio access network (RAN) and the core network (CN), is shown. In current specifications for LTE systems (see, e.g., "S1 Application Protocol," 3GPP TS 36.413 v12.2.0, available at www.3gpp.org), methods are specified that allow some self-organizing network (SON) functionality, where an eNB can request information regarding another eNB via the MME.

As noted above, UEs use CRS transmitted by the eNB to synchronize to the eNB. Many features of 3GPP Long Term Evolution (LTE) technology, as well as of other technologies, benefit from the base stations (referred to as eNBs) in the system being synchronized with one another with respect to transmit timing and frequency. Synchronization of eNBs is typically done using a global navigation satellite system (GNSS), such as the global positioning system (GPS), or by using network-based methods such as IEEE 1588v2. However, when such methods are unavailable to an eNB, it is possible to use LTE reference signals transmitted by other eNBs to acquire synchronization. Such techniques are currently being discussed in 3GPP for small cells in LTE Rel-12, where a small cell can obtain synchronization from a macro cell or from other small cells.

Currently, a network interface-based signaling approach is used for synchronization purposes among eNBs. This is enabled by means of procedures known as the "S1: eNB Configuration Transfer" and "S1: MME Configuration Transfer" procedures, according to the following steps:

A first eNB, eNB 1, generates an eNB Configuration Transfer message containing a SON Information Transfer information element (IE).

The MME receiving the eNB Configuration Transfer message forwards the SON Information Transfer IE towards a target eNB, eNB2, indicated in the IE, by means of the MME Configuration Transfer message.

If the SON Configuration Transfer IE contains a SON Information Request IE set to "Time synchronization Info," the receiving eNB2 may reply with an eNB Configuration Transfer message towards the eNB1, including a SON Information Reply IE and Timing Synchronization Information IE, which contains Stratum Level and Synchronization Status of the sending node.

The MME receiving the eNB Configuration Transfer message from eNB2 forwards it to eNB1 by means of the MME Configuration Transfer message.

In summary, within an eNB CONFIGURATION TRANSFER message from the eNB to the MME, it is possible to indicate a target eNB ID and the SON information that are required from that target eNB. The MME will therefore forward such an information request to the target eNB via a procedure called MME Configuration Transfer. Once the target eNB receives the request it will reply via the eNB Configuration Transfer towards the MME, which will include the information requested by the source eNB. The MME will forward the information requested to the source eNB by means of a new MME Information Transfer.

If a source eNB requests time synchronization information from a target eNB, the reply contained in the SON Configuration Transfer IE from target eNB to source eNB should include the above mentioned information elements (IEs):

Stratum level: This is the number of hops between the eNB and the synchronization source. That is, when the stratum level is M, the eNB is synchronized to an eNB whose stratum level is M-1, which in turn is synchronized to an eNB with stratum level M-2, and so on. The eNB with stratum level 0 is the synchronization source.

Synchronization status: This is a flag that indicates whether an eNB is currently in a synchronous or asynchronous state.

OAM Architecture

The management system architecture assumed for the present discussion is shown in FIG. 4. The node elements (NE), also referred to as eNodeB, are managed by a domain manager (DM), which is also referred to as the operation and support system (OSS). A DM may further be managed by a network manager (NM). Two NEs are interfaced by the X2 interface defined by the 3GPP specifications, whereas the interface between two DMs is referred to by the 3GPP specifications as the Itf-P2P interface. The management system may configure the network elements and may receive observations associated to features in the network elements. For example, a DM observes and configures NEs, while a NM observes and configures DMs, as well as NEs via the intermediate DMs.

By means of configuration via the DM, NM, and related interfaces, functions over the X2 and S1 interfaces can be carried out in a coordinated way throughout the RAN, eventually involving the Core Network, i.e., the MME and S-GWs.

Radio Interface-Based Synchronization (RIBS)

In recent progress in 3GPP RAN1's work, it was concluded that it would be beneficial, for synchronization purposes, to make use of patterns of time-frequency transmission resources that are selectively muted to ensure low interference, thus enabling RAN nodes in need of over-the-air synchronization to decode a synchronization reference signal that would otherwise be affected by neighbor cell interference and thus not usable. In particular, the resource elements in these muted patterns should be free from any reference signal or any other interfering signal's transmissions.

3GPP working group discussion documents R3-140997, "LS on Status of Radio-Interface Based Synchronization" (available at http://www.3gpp.org/FTP/tsg_ran/WG3_Iu/TSGR3_84/LSin/) and R1-142762, "LS on Radio Interface Based Synchronization" (available at http://www.3gpp.org/Liaisons/Outgoing_LSs/R1-meeting.htm), describe the agreements taken by RAN1 in terms of what characteristics such patterns should have.

In summary, the agreements state that the network should support the enabling of patterns of interference-protected time/frequency resources. These patterns can repeat themselves in time according to a period selected from a range specified in the latter of the two documents specified immediately above. It should be noted that these patterns are different from existing Almost Blank Subframes patterns, which are used for enhanced inter-cell interference coordination (eICIC). One difference is that in ABS patterns, reference signals are transmitted without interruption, which is one of the reasons why such patterns are made of so-called "Almost" blank subframes.

The 3GPP discussion documents identified above specify that the reference signals that a RAN node can use to achieve synchronization could be different, and that the interference protected patterns should therefore ensure protection towards all reference signals. In summary, the information from these documents that are relevant to the specification of signaling needed to make the radio interface-based synchronization mechanisms work are as follows.

Excerpts from R3-140997 (cited above):
Agreement:
Specify listening RS(s) including RS pattern, and subframe periodicity, and offset, for both FDD and TDD
Agreement:
PRS and/or CRS is used as the listening RS for RIBS
FFS: Down-select of listening RS
Subframe-level muting is supported for RIBS
Excerpts from R1-142762 (cited above):
For network listening, the following RS pattern is supported by configuration
CRS only
The number of CRS ports can be 1 or 2
CRS and PRS
The number of CRS ports can be 1 or 2
The eNB should use one periodicity and offset of network listening RS that can be selected from the following recommended range of values
A range of values (>=2) for the periodicity
Choose all or a subset from [1280 ms, 2560 ms, 5120 ms, 10240 ms]
There is no consensus in RAN1 on the additional periodicities of 640 ms and 20480 ms
Values of offsets FFS
The max number of hops is kept at 3.

While the documents above provide a starting point for enabling interference protection for over-the-air synchronization measurements, further work is needed to provide complete solutions.

SUMMARY

The agreements taken in the RAN1 working group of 3GPP leave unresolved the problem of how to enable inter-node communication aimed at coordinating the enabling of interference-protected patterns. Embodiments of the presently disclosed techniques and apparatus thus include methods for enabling and disabling of muting patterns in RAN nodes for the purpose of allowing better detection and use of reference symbols (RS) used for synchronization.

Some of these methods allow a node to request activation or deactivation of muting patterns. In response, the nodes involved in enabling RIBS muting patterns are allowed to flexibly select the patterns and pattern period that best suits their conditions, for example, to select the patterns and pattern periods that best fit with the resource demands of current traffic.

In a number of embodiments, coordination of muting patterns amongst different nodes is enabled, so that muting of multiple nodes results in increased protection from interference for the node in need of detecting the synchronization RS. Also, in other embodiments, activation requests towards a single node may trigger enabling of muting patterns in a wider set of cells. This latter approach reduces the amount of signaling needed and provides immediate alleviation from interference from multiple RAN nodes' cells.

According to a first aspect of the techniques and apparatus disclosed herein, a method is implemented in a base station operating in a wireless communications network, for facilitating over-the-air synchronization by a neighboring base station. This method includes receiving a request for activation of a reference signal muting pattern for a cell supported by the base station and activating the reference signal muting pattern in response to the request. The method further includes sending a message requesting activation of a reference signal muting pattern for a cell supported by a second base station, in response to the request According to a second aspect, another method is implemented in a control node operating in a wireless communications network, for facilitating over-the-air synchronization by a first base station with a first neighbor cell of a plurality of neighbor cells, the method comprising receiving a first message from the first base station. The first message indicates that reference signal muting by one or more of the plurality of neighbor cells is needed. The method further comprises determining that a muting pattern should be activated for at least a second neighbor cell, based on at least the identity of the first base station or the first cell, where the first message does not identify the second neighbor cell. The method further comprises sending a second message to at least a second base station, corresponding to the second neighbor cell, the second message requesting activation of a reference signal muting pattern for the second neighbor cell.

According to a third aspect, another method is implemented in a control node operating in a wireless communications network, for facilitating over-the-air synchronization by a first base station with a first neighbor cell of a plurality of neighbor cells. This method comprises sending a first configuration message to a first base station, the configuration message identifying a first reference signal muting pattern for use in a first cell corresponding to the first base station. The method further comprises sending a second configuration message to a second base station, the second configuration message identifying a second reference signal muting pattern for use in a second cell corresponding to the second base station, where the first and second reference signal muting patterns comprise one or more common muted resources.

According to a fourth aspect, a base station is configured for operating in a wireless communications network and to facilitate over-the-air synchronization by a neighboring base station. The base station is adapted to receive a request for activation of a reference signal muting pattern for a cell supported by the base station and to activate the reference signal muting pattern in response to the request. The base station is further adapted to send a message requesting activation of a reference signal muting pattern for a cell supported by a second base station, in response to the request.

According to a fifth aspect, a control node is configured for operating in a wireless communications network and to facilitate over-the-air synchronization among base stations. The control node is adapted to receive a first message from a first base station, the first message indicating that reference signal muting by one or more of the plurality of neighbor cells is needed. The control node is further adapted to determine that a muting pattern should be activated for at least a second neighbor cell, based on at least the identity of the first base station or the first cell, wherein the first message does not identify the second neighbor cell. The control node is still further adapted to send a second message to at least a second base station, corresponding to the second neighbor cell, the second message requesting activation of a reference signal muting pattern for the second neighbor cell.

According to a sixth aspect, a control node is configured for operating in a wireless communications network and to facilitate over-the-air synchronization among base stations. The control node is adapted to send a first configuration message to a first base station, the configuration message identifying a first reference signal muting pattern for use in a first cell corresponding to the first base station. The control node is further adapted to send a second configuration message to a second base station, the second configuration message identifying a second reference signal muting pattern for use in a second cell corresponding to the second base station, where the first and second reference signal muting patterns comprise one or more common muted resources.

Other embodiments of the techniques and apparatus described herein include computer program products comprising program instructions for carrying out one or more of the methods summarized above and/or variants thereof, as well as computer-readable media embodying any one or more of these computer program products.

DETAILED DESCRIPTION

Figure 1:
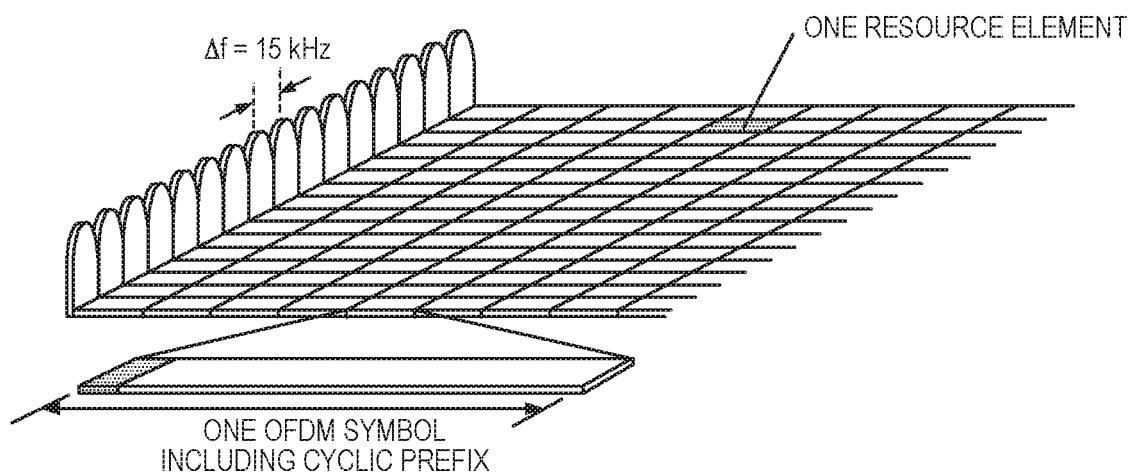
FIG. 1 illustrates time-frequency resources in a system using Orthogonal Frequency-Division Multiplexing (OFDM).
Figure 2:
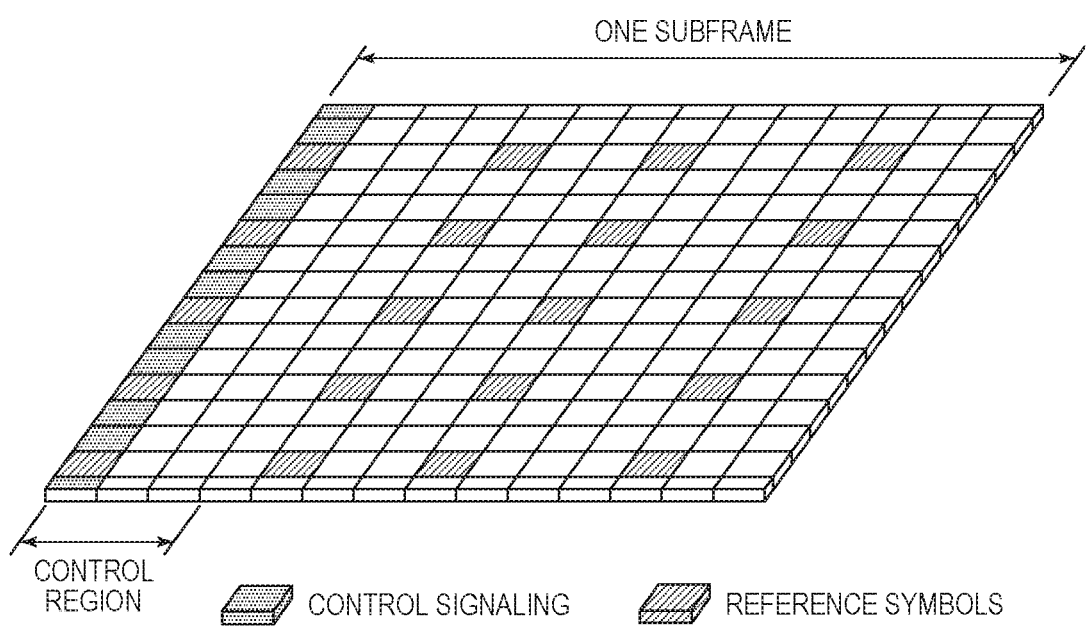
FIG. 2 illustrates a subframe in an LTE system.

In the discussion that follows, specific details of particular embodiments of the presently disclosed techniques and apparatus are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes.

Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, a magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC(s)) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

References throughout the specification to "one embodiment" or "an embodiment" mean that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

While the following examples are described in the context of LTE systems, the principles described in the following disclosure may be equally applied to other cellular networks. Other wireless systems, including WCDMA, WiMax, UMB and GSM, may also benefit from exploiting the techniques described herein. Also note that the use of terminology such as eNodeB and UE should be considering non-limiting, and does not necessarily imply a certain hierarchical relation between the two; in general, an "eNodeB" could be considered as a first wireless device and a "UE" as a second wireless device, where these two devices communicate with one another over a radio channel. Similarly, when talking about signaling over an X2 backhaul, the solutions are not necessarily limited to communication between eNBs but the communicating nodes can be any node terminating the backhaul interface over which the information described is transmitted.

Figure 3:
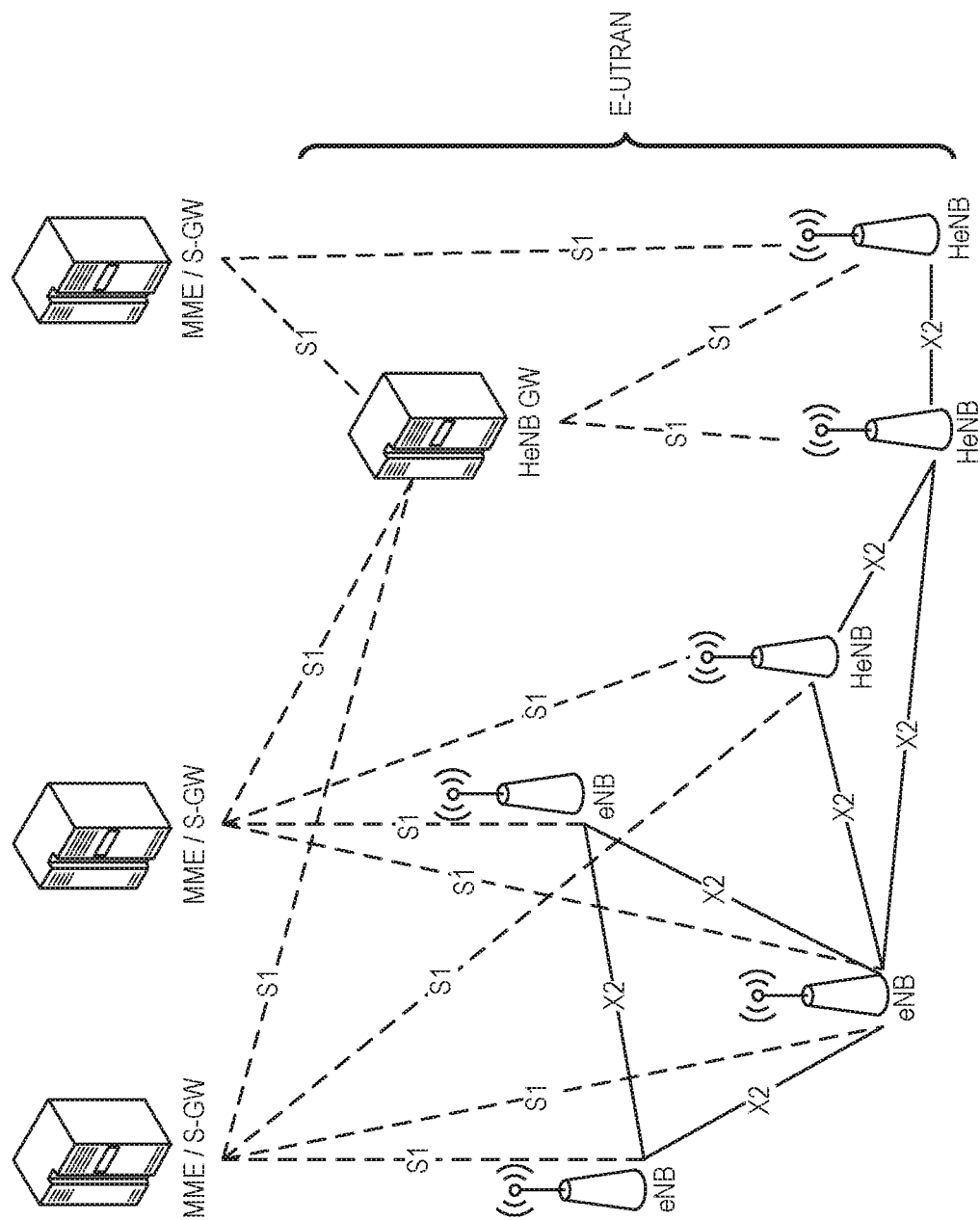
FIG. 3 illustrates a simplified version of the architecture of the E-UTRAN system.
Figure 4:
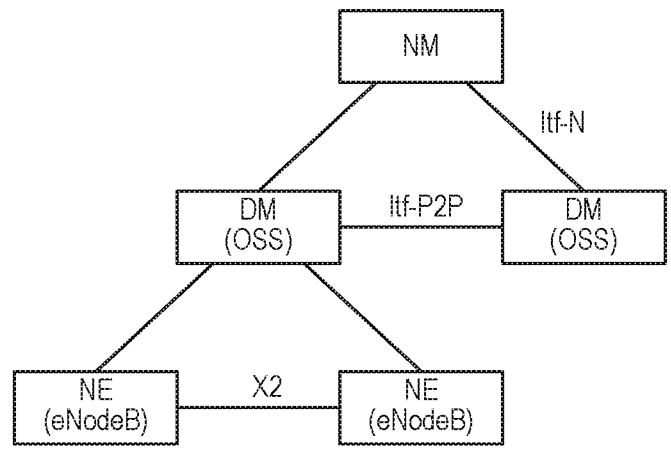
FIG. 4 illustrates a management architecture.
Figure 5:
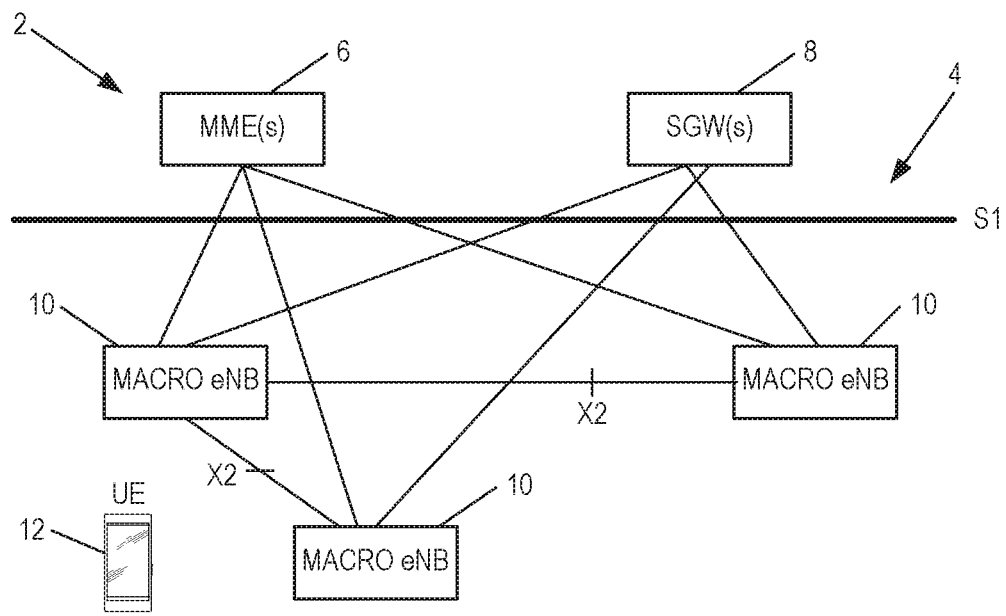
FIG. 5 is another view of the E-UTRAN system.

FIG. 5 is another view of an E-UTRAN architecture, as part of an LTE-based communications system 2. Nodes in the core network 4 include one or more Mobility Management Entities (MMEs) 6, which are key control nodes for the LTE access network, and one or more Serving Gateways (SGWs) 8, which route and forward user data packets while acting as mobility anchors. The MMEs 6 and SGWs 8 communicate with base stations 10 referred to in LTE as eNBs, over interfaces specified by the 3GPP standards, such as the S1 interface. The eNBs 10 can include two or more of the same or different categories of eNBs, e.g., macro eNBs, and/or micro/pico/femto eNBs. The eNBs 10 communicate with one another over an interface, for example an X2 interface. The S1 interface and X2 interface are defined in the LTE standard. A UE 12 can receive downlink data from and send uplink data to one of the base stations 10, with that base station 10 being referred to as the serving base station of the UE 12. It should be appreciated that while the techniques described herein may be applied in the context of an E-UTRAN network, e.g., as illustrated in FIGS. 3 and 5, the techniques may also be applied in other network contexts, including in UTRA networks, or even in peer-to-peer communications, such as in an ad-hoc network or in a so-called device-to-device scenario.

In some of the embodiments described herein, the non-limiting terms "user equipment" and "UE" are used. A UE, as that term is used herein, can be any type of wireless device capable of communicating with a network node or another UE over radio signals, including an MTC device or M2M device. A UE may also be referred to as a mobile station, a radio communication device, or a target device, and the term is intended to include device-to-device UEs, machine-type UEs or UEs capable of machine-to-machine communication, sensors equipped with a UE, wireless-enabled table computers, mobile terminals, smart phones, laptop-embedded equipment (LEE), laptop-mounted equipment (LME), USB dongles, wireless customer-premises equipment (CPE), etc.

Figure 6:
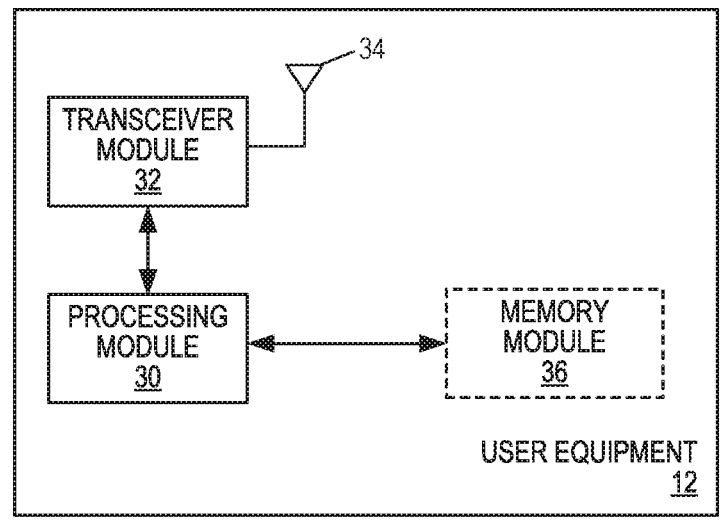
FIG. 6 illustrates components of an example user equipment.

FIG. 6 shows a user equipment (UE) 12 that can be used in one or more of the systems described herein. The UE 12 comprises a processing module 30 that controls the operation of the UE 12. The processing module 30, which may comprise one or more microprocessors, microcontrollers, digital signal processors, specialized digital logic, etc., is connected to a receiver or transceiver module 32 with associated antenna(s) 34 which are used to receive signals from and/or to transmit signals to a base station 10 in the network 2. The user equipment 12 also comprises a memory circuit 36 that is connected to the processing module 30 and that stores program code and other information and data required for the operation of the UE 12. Together, the processing module and memory circuit may be referred to as a "processing circuit," and are adapted, in various embodiments, to carry out one or more of any UE-based techniques described below.

In the description of some embodiments below, the generic terminology "radio network node" or simply "network node (NW node)" is used. These terms refer to any kind of wireless network node, such as a base station, a radio base station, a base transceiver station, a base station controller, a network controller, an evolved Node B (eNB), a Node B, a relay node, a positioning node, a E-SMLC, a location server, a repeater, an access point, a radio access point, a Remote Radio Unit (RRU) Remote Radio Head (RRH), a multi-standard radio (MSR) radio node such as MSR BS nodes in distributed antenna system (DAS), a SON node, an O & M, OSS, or MDT node, a core network node, an MME, etc.

Figure 7:
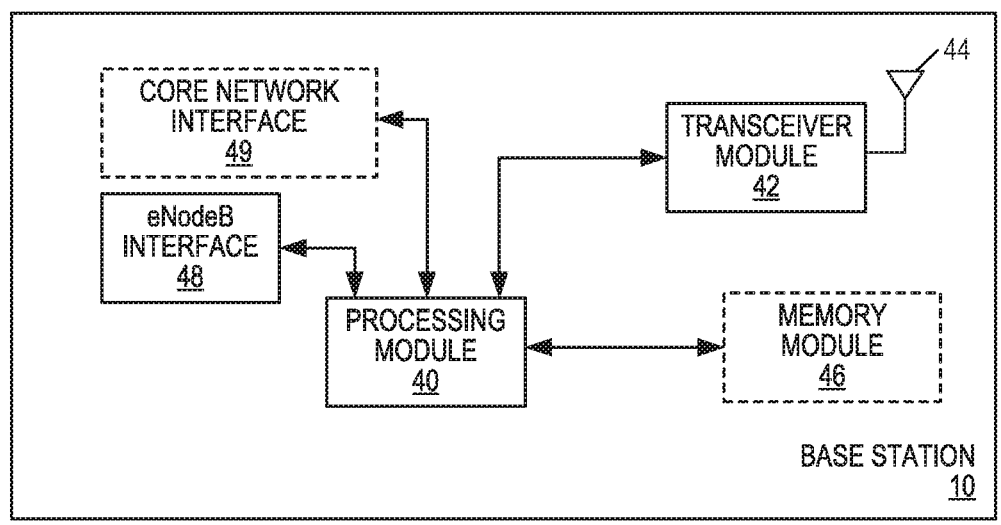
FIG. 7 illustrates components of an example base station.

FIG. 7 shows a base station 10 (for example a NodeB or an eNodeB) that can be used in example embodiments described. It will be appreciated that although a macro eNB will not in practice be identical in size and structure to a micro eNB, these different examples of base station 10 will generally include similar or corresponding components, although the details of each of those components may vary to accommodate the different operational requirements of a particular embodiment.

The illustrated base station 10 comprises a processing module 40 that controls the operation of the base station 10. The processing module 40, which may comprise one or more microprocessors, microcontrollers, digital signal processors, specialized digital logic, etc., is connected to a transceiver module 42 with associated antenna(s) 44, which are used to transmit signals to, and receive signals from, user equipments 12 in the network 2. The base station 10 also comprises a memory circuit 46 that is connected to the processing module 40 and that stores program and other information and data required for the operation of the base station 10. Together, the processing module 40 and memory circuit 46 may be referred to as a "processing circuit," and are adapted, in various embodiments, to carry out one or more of the network-based techniques described below.

The base station 10 also includes components and/or circuitry 48 for allowing the base station 10 to exchange information with other base stations 10 (for example, via an X2 interface) and components and/or circuitry 49 for allowing the base station 10 to exchange information with nodes in the core network 4 (for example, via the S1 interface). It will be appreciated that base stations for use in other types of network (e.g., UTRAN or WCDMA RAN) will include similar components to those shown in FIG. 7 and appropriate interface circuitry 48, 49 for enabling communications with the other network nodes in those types of networks (e.g., for communications with other base stations, mobility management nodes and/or nodes in the core network).

It will be appreciated that other nodes in the communication network may have a structure that is similar to that illustrated in the FIG. 7, with the transceiver module 42 omitted in those nodes that are not radio base stations. Nodes in the core network may have a RAN network interface circuit in place of core network interface circuit 49, in some embodiments.

As noted above, many features of 3GPP Long Term Evolution (LTE) technology, as well as of other technologies, benefit from the base stations (referred to as eNBs) in the system being synchronized with one another with respect to transmit timing and frequency. Synchronization of eNBs is typically done using a global navigation satellite system (GNSS) such as the global positioning system (GPS) or by using network-based methods such as IEEE 1588v2. However, when such methods are unavailable to an eNB, it may be possible to use LTE reference signals transmitted by other eNBs to acquire synchronization. Such techniques are currently being discussed in 3GPP for small cells in LTE Rel-12, where a small cell can obtain synchronization from a macro cell or from other small cells.

The problem addressed by the presently disclosed techniques and apparatus is how to enable a mechanism that allows the RAN node in need of synchronization to correctly detect and use the most appropriate synchronization reference signal. More particularly these techniques facilitate the enabling of a pattern of resources protected from interference, on which the node can listen to the synchronization RS and synchronize to it. Such a pattern will be also referred to as a "muting pattern" or "RIBS muting pattern" herein.

The enabling of a muting pattern should depend on whether there is a node in need of interference protection for synchronization purposes. Indeed, keeping a set of time-frequency resources muted in any cell generally results in a loss of resources and a decrease of system performance. Therefore, the techniques described herein allow activation and deactivation of muting patterns from relevant interfering cells depending on whether there are nodes in need of synchronizing to other cells that would benefit from such interference protected patterns.

Another problem the presently disclosed techniques and apparatus address is how to achieve coordination of muting patterns and the activation of muting patterns. Namely, the Radio Access Network (RAN) node in charge of activating muting patterns is the only node aware of the traffic demand on the node at activation time. It should therefore be up to this node to decide the amount of muting to apply that is feasible, given the traffic demand that is currently sustained. At the same time, it would be beneficial to address methods that enable a wider number of cells interfering at the same time with the synchronization RS to activate coordinated muting patterns, i.e., muting patterns sharing the same muting resources.

In the 3GPP discussion document R3-141214, "Discussion on How to Support RIBS" (available at http://www.3gpp.org/ftp/Meetings_3GPP_SYNC/RAN3/Docs/), solutions trying to address the signaling of muting pattern information for RIBS purposes are presented. However, all of the presented solutions are subject to several shortfalls. First, the solutions proposed are suboptimal and inefficient because they all rely on an indication, sent from the node in need of synchronization to the node selected for synchronization, where the indication informs the receiving node that synchronization will happen with one of its cells. This indication is unnecessary because, upon selection of a synchronization node, there are no changes in the mode of operation of the node that is providing synchronization signals. Therefore this indication results in unnecessary signaling. Second, these solutions are non-scalable and inefficient because they are based on the communication of muting patterns from the node in need of synchronization to the interfering nodes. The node in need of synchronization is unaware of the load demand conditions of the interfering nodes and would not be able to accurately determine how much resource muting the interfering node would be able to afford. In addition, in the event that a second node in need of synchronization requested the same interfering node to activate a different muting pattern, the interfering node may have either to reject the request due to an excessive overall amount of resources to mute or it may accept it, with the consequence of a higher loss of capacity due to different, possibly non-overlapping, muting patterns Embodiments of the presently disclosed invention enable the exchange of information about the possibility of activating muting patterns at interfering cells that would allow a node that needs to correctly and timely decode a synchronization signal to do so.

These embodiments also allow activation and deactivation of muting patterns to occur only when needed. Namely, resources are muted only when there is a need for interference reduction for the purpose of synchronization, in some embodiments, avoiding unnecessary losses in capacity.

Embodiments also allow a node that receives a request to mute resources to select an appropriate muting pattern according to its traffic conditions and cell status.

Also detailed below are implementation-specific simplifications of muting pattern activation and deactivation mechanisms, where muting can be activated simultaneously on a number of nodes and cells. The latter can be determined by the stratum number of a node or by an existing understanding of the interfering cells for a given node in need of synchronization.

Embodiments allow for coordination of muting patterns amongst different nodes, so to allow for maximum interference protection on muted resources, while minimizing capacity losses.

In order to explain a first method according to some embodiments of the invention, an example scenario is detailed here. In particular, the scenario takes as an example the LTE system, and consists of a case where an eNB detects a cell's reference signal suitable for synchronization, where the synchronization source has a stratum number lower than other detected RSs. (It will be appreciated that per convention, the lower the stratum level, the higher the signal accuracy is with respect to an ultimate synchronization source such as GNSS.) In this scenario, it would be beneficial if other cells interfering with the synchronization signal could adopt a muting pattern where all RSs are muted in certain subframes, according to a certain pattern that can repeat with a certain period, e.g., as in the 3GPP documents R3-140997 and R1-142762 mentioned above.

Figure 8:
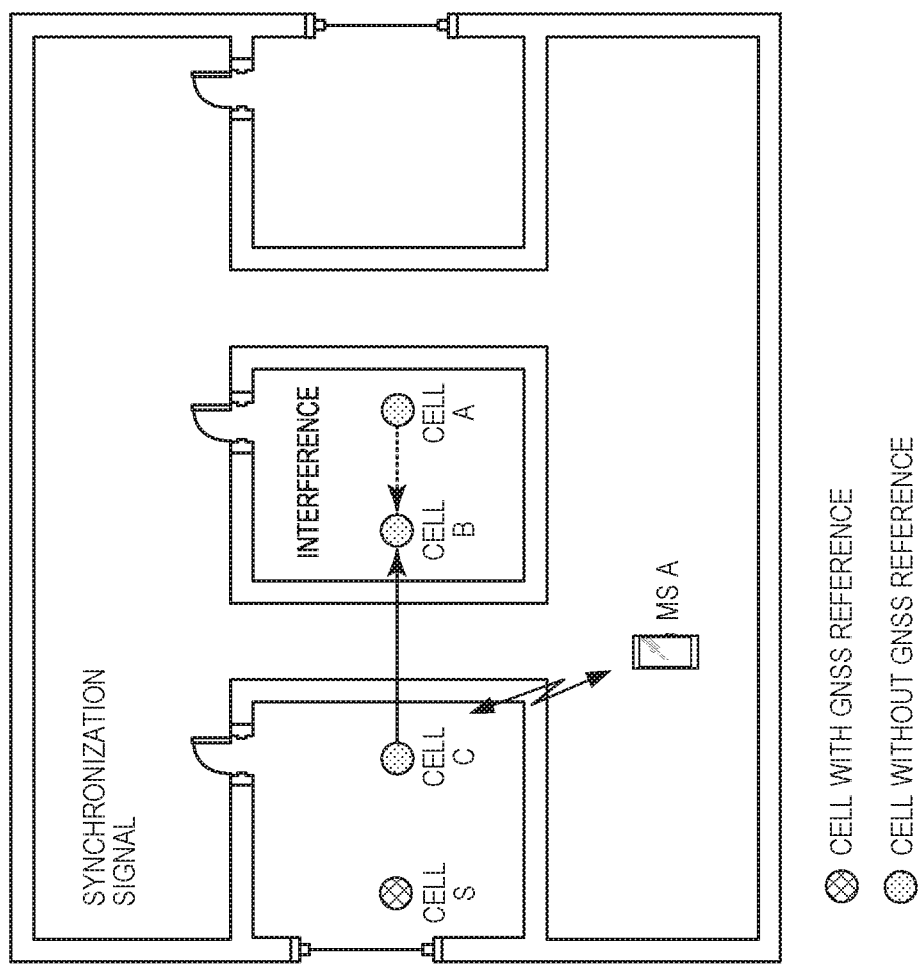
FIG. 8 shows an example scenario in which the presently disclosed techniques may be employed.

FIG. 8 illustrates a possible scenario where such radio interface-based synchronization (RIBS) may be needed. In FIG. 8 it can be seen that Cell S emits a reference signal that is GNSS-synchronized. eNB C, which serves Cell C and may serve mobile station MS A, for instance, can deduce such information via, for example, S1 signaling of the SON Information IE, namely by receiving a Time Synchronization Info IE where the Stratum Level IE has been set to "0", as per specifications in 3GPP TS 36.413, v12.2.0.

Similarly, eNB A, which serves Cell A, can deduce that Cell C is a better synchronization source than Cell B and may try to use Cell C's RS to synchronize. However, in order to achieve correct detection of Cell C's RS, eNB A needs to be protected from interference from Cell B.

For this reason, RAN1 has agreed that it would be beneficial to establish a subframe-muting pattern, i.e., a pattern of subframes where all RS signals of interfering cells are muted.

As an assumption of a first method to be detailed below, it is considered that the set of muting patterns available for activation in cells of a RAN node does not change frequently. Therefore, these patterns can be configured from a centralized entity such as the OAM, so that the RAN node has a set of muting patterns available for activation at any given time.

According to some embodiments of the techniques detailed below, muting patterns in a RAN node's cells are activated and deactivated only when needed. Such activation and deactivation shall be triggered by specific events. For example, if a RAN node decides to perform over-the-air synchronization using a neighbor cell's RS signal that is considered the best synchronization source available, and if such synchronization requires other neighbor cells to mute (or reduce interference on) time-frequency resources in order to properly decode the signal, then muting patterns in those other neighbor cells need to be activated. Further, such patterns would need to be deactivated as soon as they are no longer needed, for example if the source of synchronization RS is not available any longer or if a better synchronization signal not requiring muting from neighbor cells becomes available.

Activation and deactivation of muting patterns are both important. In fact, maintaining muting patterns activated when the muting patterns are not needed would incur a loss of time-frequency resources and therefore a degradation of system performance and reduced capacity.

On the basis of the observations above, one way to achieve activation and deactivation of muting patterns could include the following steps, all or some of which may be used in various embodiments:

Advertising the availability of muting patterns by means of dedicated signaling or by enhancing existing signaling. For example, in the case of LTE this might consist of enhancing the SON Information Reply IE (received as a consequence of sending a SON Information Request IE set to "Time Synchronization Info") with new information flagging muting patterns availability.

Enabling a RAN node (for example an eNB suffering from neighbor cells' interference) to request neighbor RAN nodes' activation of muting patterns, by means of dedicated signaling or by enhancing existing signaling. For example, in the case of LTE this might consist of enhancing the SON Information Request IE with information indicating an activation request. The RAN node could also request the specific resources that should be muted, i.e., the pattern and periodicity.

Enabling a RAN node (for example an aggressor eNB) to signal muting patterns and patterns period by means of dedicated signaling or by enhancing existing signaling. For example, in the case of LTE this might consist of enhancing the SON Information Reply IE with new information indicating a chosen muting pattern, a pattern period and other related information.

Enabling a RAN node (for example an eNB) to request de-activation of muting patterns by means of dedicated signaling or by enhancing existing signaling. For example, in the case of LTE this might consist of enhancing the SON Information Request IE with information requesting deactivation of muting patterns.

In the case of an LTE system the above steps can be achieved by means of the example procedures shown in FIG.

9, which illustrates an example signaling procedure to enable/disable muting patterns for RIBS.

Figure 9:
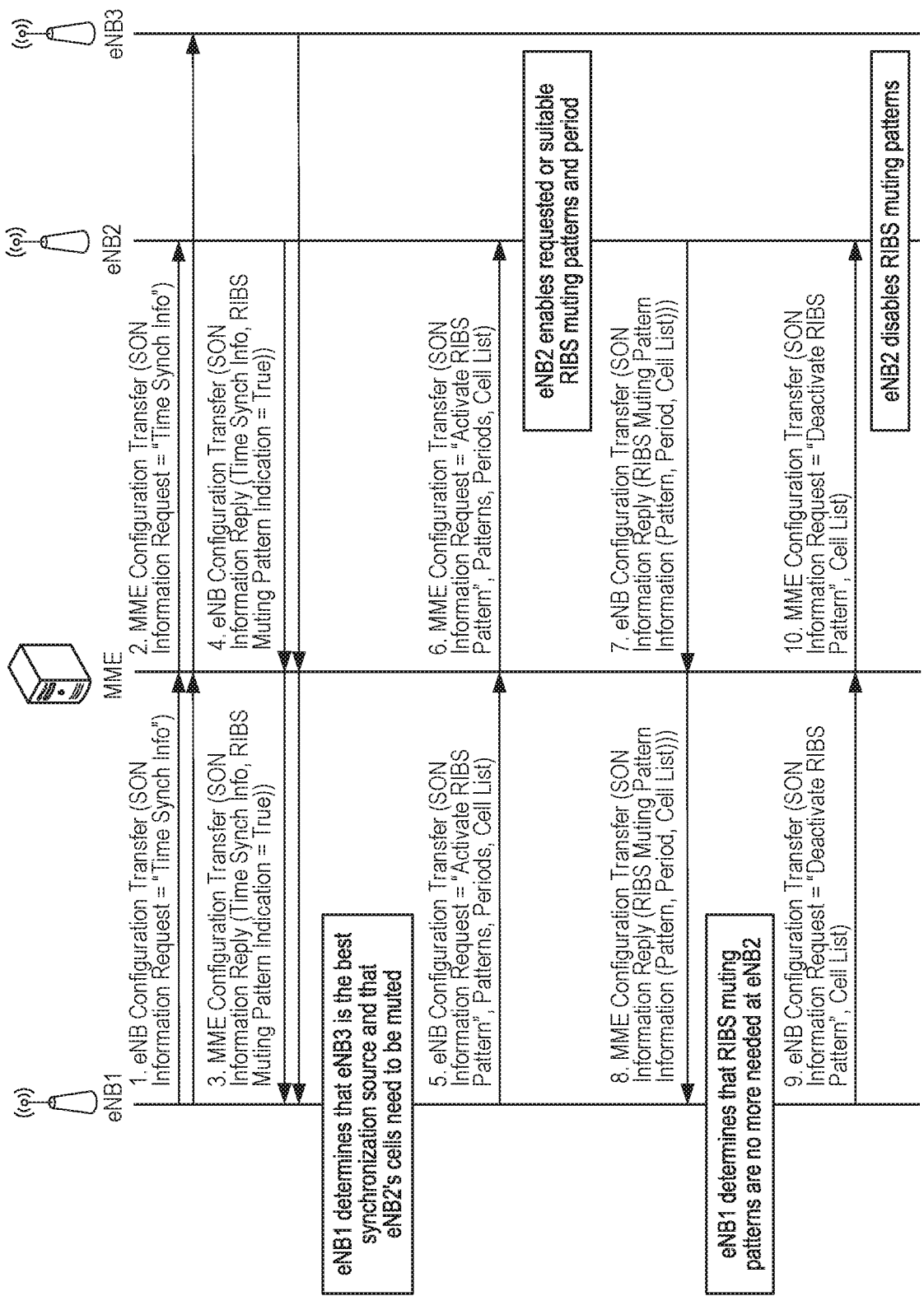
FIG. 9 is a signal flow diagram illustrating some embodiments of the presently disclosed techniques.

FIG. 9 can be described as follows:

Messages 1-2) An eNB1 in need of synchronization detects one or more cells from eNB2 and eNB3 and sends an eNB Configuration Transfer message with SON Information Request IE set to "Time Synchronization Info" to eNB2 and eNB3. The SON Information Request IE will be transparently forwarded as part of an MME Configuration Transfer to the target eNB2 and eNB3.

Messages 3-4) eNB2 and eNB3 respond with an eNB Configuration Transfer message containing the SON Information Reply IE. This IE contains information such as the Time Synchronization Information IE and in addition it contains a new optional flag stating whether RIBS muting patterns are available for activation or not (for example, the muting patterns may not be available because they are not supported in the receiving eNB or because traffic conditions are such that no muting can be supported). The information will be forwarded to eNB1 in MME Configuration Transfer messages Messages 5-6) eNB1 evaluates which RS signals among cells of eNB2 and eNB3 are the best available. Such evaluation may be done on the basis of parameters such as signal strength, eNB stratum level, synchronization status. Assuming that one of eNB3's cells is the best synchronization source, eNB1 determines that for correct detection of RS from eNB3, RS signals from eNB2 need to be muted. Therefore, eNB1 sends an eNB Configuration Transfer message towards eNB2 with a SON Information Request IE set to a new value, e.g., "Activate RIBS Pattern".

The message may also contain a list of cells for which the muting pattern should be applied, depending on which cells the eNB1 considers to be the strongest interfering cells. In addition, the message may also contain the set of resources which should be muted, e.g., subframe pattern and periodicity. Multiple options for such muting could be provided with some of the options being subsets of others.

Messages 7-8) eNB2, namely the interfering eNB, selects the pattern and pattern periodicity that best suits its conditions such as traffic load and enables such pattern for the cells indicated by eNB1. eNB2 responds with an eNB Configuration Transfer message towards eNB1, where the SON Information Reply IE contains RIBS muting patterns characteristics and list of cells for which the patterns have been enabled Messages 9-10) At a later point in time, it may occur that muting from eNB2's cells may no longer be needed. For example, eNB1 may not need the RS of eNB3 as source of synchronization or indeed it may happen that eNB3's signals become unavailable. In this case, eNB1 may request deactivation of the muting patterns via an eNB Configuration Transfer message towards eNB2 where the SON Information Request IE or another new or existing IE has been set to a new value such as "Deactivate RIBS Pattern". Optionally, a list of cells for which deactivation has to occur can be specified.

The procedure described in FIG. 9 follows two simple and advantageous principles, namely: reusing existing procedures to exchange information about RIBS muting patterns and enabling activation and deactivation of muting patterns.

Note that by reusing existing procedures it is possible to save signaling messages. For example, as shown in FIG. 9, a SON Information Reply IE may contain both "Time Synchronization Information" and an indication of RIBS muting patterns availability.

In one variation of the method above, the RAN node receiving the muting pattern activation request does not reply with a muting pattern but only with a pattern period. The assumption in this case would be that muting patterns are configured in each RAN node in a given neighborhood in such a way that each node knows what pattern is supported by a node where an activation request is sent.

In another variation of the above method, the exchange of information relative to muting patterns activation and deactivation may occur via the X2 interface. A number of procedures can be used to enable such information exchange, for example: X2: Load Information, X2: Resource Information Request/Response/Update, X2 Setup Request/Response, eNB Configuration Update.

Figure 10:
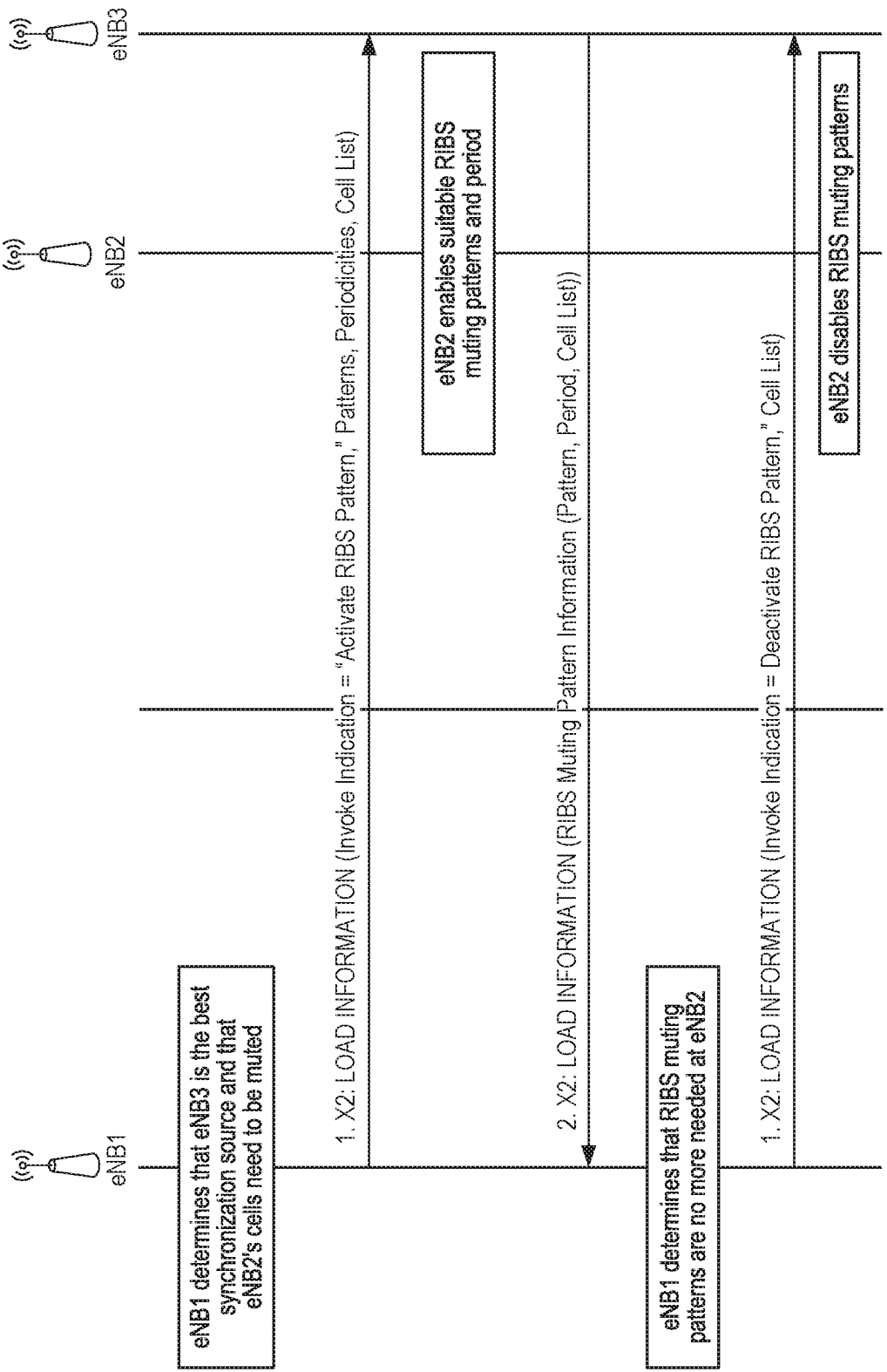
FIG. 10 is another signal flow diagram, again illustrating some embodiments of the presently disclosed techniques.

An example of how such procedure can be enabled over X2 is provided in FIG. 10, which shows an example of the exchange of information regarding RIBS muting patterns over X2.

In FIG. 10 it is assumed that signaling enabling eNB1 to discover which node is the best synchronization source has already occurred. Such signaling could consist of reusing the S1: eNB Configuration Transfer and S1: MME Configuration Transfer messages or it could consist of new X2 signaling that carries equivalent information.

It is also assumed that eNB1 knows whether support for RIBS muting patterns is available at eNB2 and eNB3. This can be achieved via the techniques outlined above, or via new signaling over X2.

FIG. 10 can be described as follows:

Message 1: RIBS muting pattern activation is shown in message 1 and it is achieved by means of enhancing the LOAD INFORMATION message and adding a new code value to the Invoke Indication IE. Such new value could be set to "Activate RIBS Pattern" or any equivalent value triggering an activation request. The activation request can be sent to one or more cells that can be identified in the message by means of their Cell IDs. The request can also include a requested muting pattern and periodicity or a set of multiple patterns and periodicities. If multiple patterns are provided, some patterns and periodicities can be a subset of others.

Message 2: eNB analyzes whether muting patterns can be activated. If this is possible, it enables muting patterns and sends muting pattern structures, pattern periods and the cell identifier to which each of the specified patterns applies in a LOAD INFORMATION message back to eNB1.

Message 3: In the case where muting patterns from eNB2 do not need to be active anymore, eNB1 may send an X2: LOAD INDICATION message where the Invoke Indication IE has been set to a new value indicating deactivation of the muting pattern. This new value may be set for example to "Deactivate RIBS Pattern" or any equivalent value triggering a deactivation request. The deactivation request can be sent to one or more cells that can be identified in the message by means of their Cell IDs.

Figure 11:
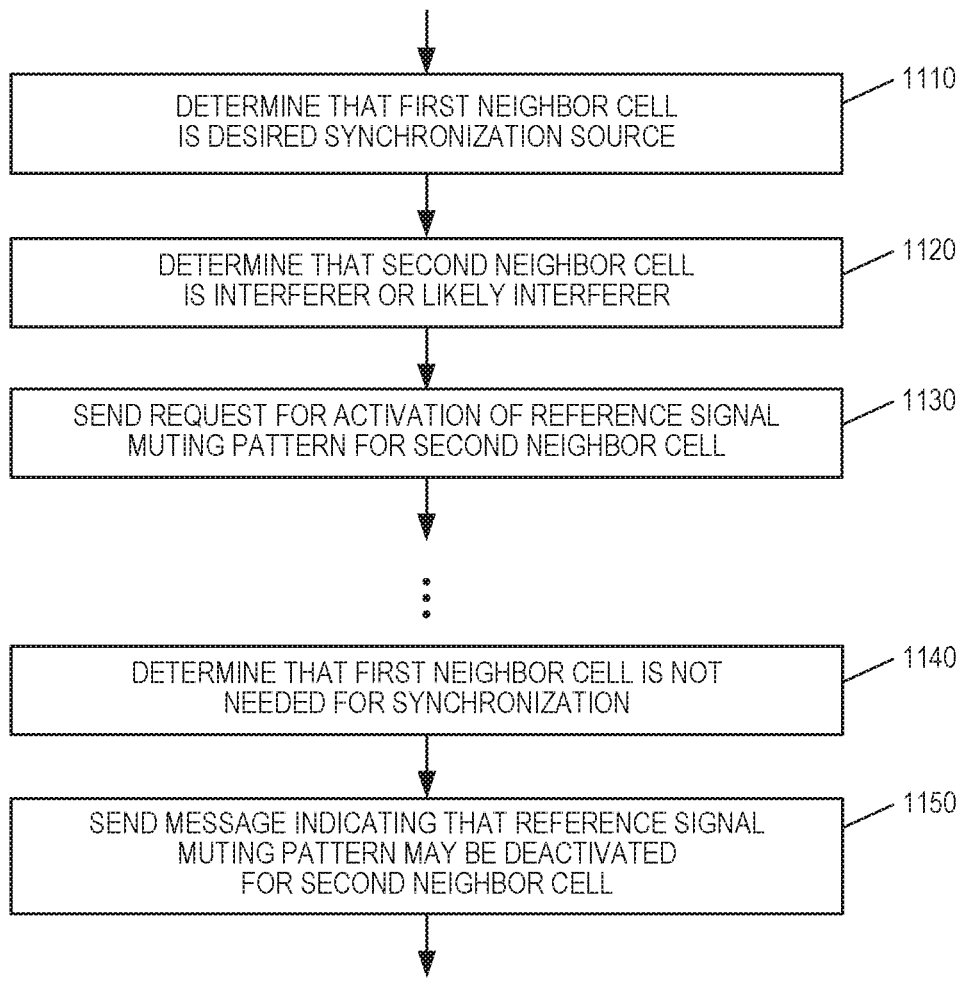
FIG. 11 is a process flow diagram illustrating an example method according to some of the disclosed techniques.
Figure 12:
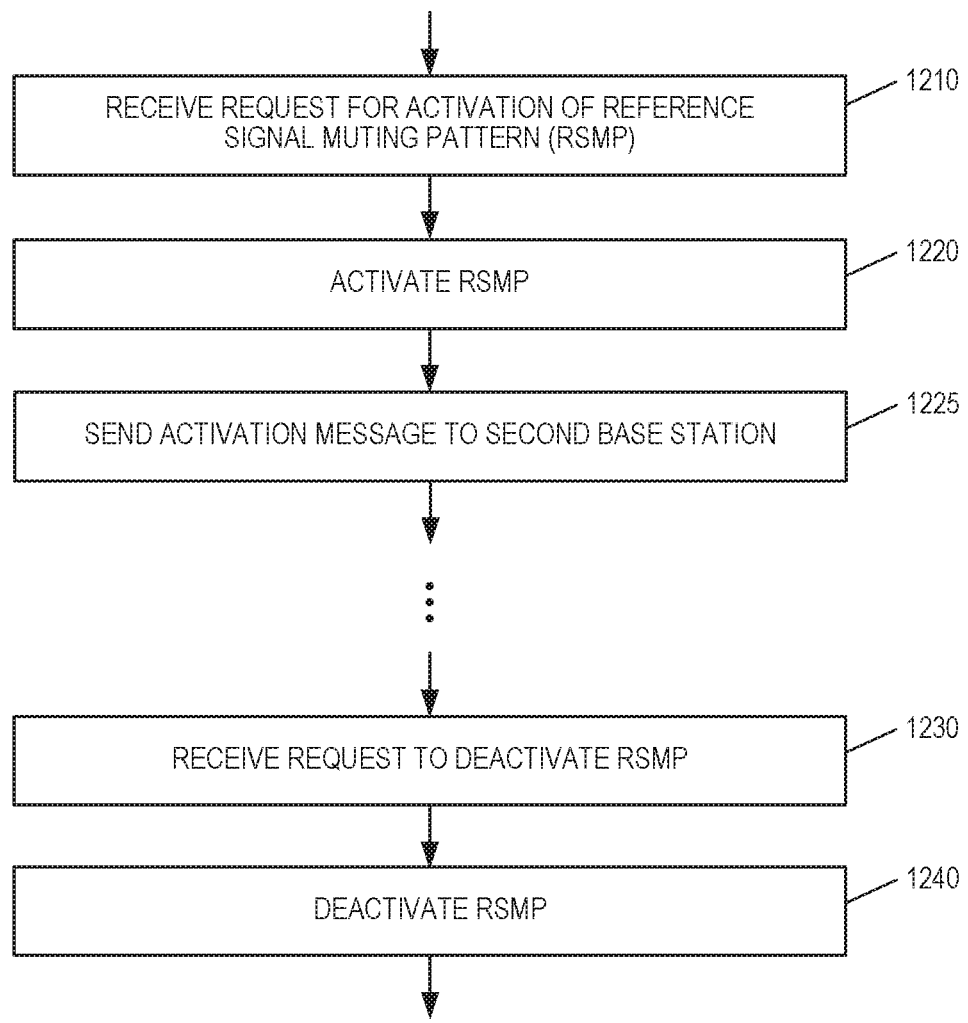
FIG. 12 is another process flow diagram illustrating an example method according to some of the disclosed techniques.
Figure 13:
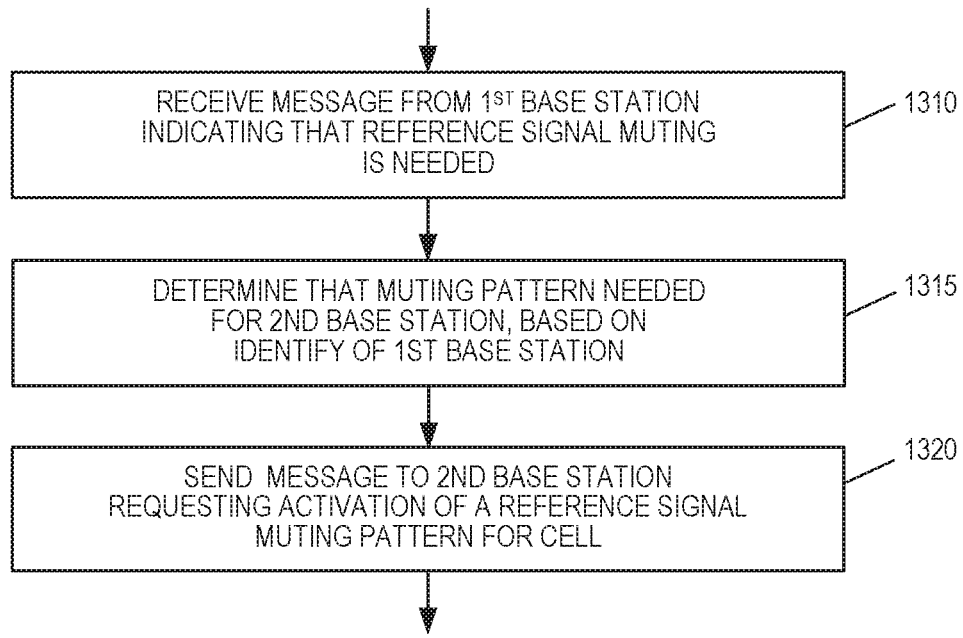
FIG. 13 is still another process flow diagram illustrating an example method according to some of the disclosed techniques.

In view of the discussion presented above, it will be appreciated that the process flow diagrams of FIGS. 11-13 illustrate examples of methods carried out in accordance with the presently disclosed techniques.

FIG. 11, for example, illustrates a method in a base station operating in a wireless communications network, for facilitating over-the-air synchronization with a neighboring base station. As shown at block 1110, the method includes determining that a first neighbor cell of a plurality of neighbor cells is a desired synchronization source. The method further includes determining that a second neighbor cell of the plurality of neighbor cells is interfering with or is likely to interfere with a signal, from the first neighbor cell, that is used for synchronization, as shown at block 1120. In response, as shown at block 1130, a request for activation of a reference signal muting pattern by the second neighbor cell is sent towards the second base station. In some embodiments, the request for activation is sent to a controlling node in the wireless communications network, where the controlling node controls a base station corresponding to the second cell. In other embodiments, the request for activation is sent directly to the base station corresponding to the second cell.

As shown at blocks 1140 and 1150, the method further includes subsequently determining that the signal from the first neighbor cell is not needed or is unavailable for synchronization and, in response, sending a message, towards the second neighbor cell, indicating that the reference signal muting pattern may be deactivated.

In some embodiments of the illustrated method, determining that the first neighbor cell is a desired synchronization source comprises receiving synchronization information from at least the first neighbor cell, the synchronization information indicating at least one of a stratum level and synchronization status, and evaluating the received synchronization information. In some embodiments, determining that the first neighbor cell is a desired synchronization source is based at least in part on a signal strength of a signal received from the first neighbor cell.

Some embodiments further comprise receiving an indication of whether a reference signal muting pattern is available for the second neighbor cell. In these embodiments, sending the request for activation of the reference signal muting pattern is responsive to receiving said indication. The indication may comprise or be associated with an identification of one or more muting patterns available for the second neighbor cell, in some embodiments. In these and in other embodiments, the request for activation of the reference signal muting pattern includes a list of cells for which a muting pattern should be applied, and/or includes an identification of one or more resources that should be muted. This identification of resources may comprise a subframe pattern, or a pattern periodicity, or both.

Although not shown in FIG. 11, synchronization can be performed based on the signal from the first neighbor cell. In some embodiments, this may be based on receiving information identifying which resources are being muted or are to be muted by the second neighbor cell.

FIG. 12 illustrates a related method, in a base station operating in a wireless communications network, for facilitating over-the-air synchronization by a neighboring base station. As shown at blocks 1210 and 1220, the illustrated method includes receiving a request for activation of a reference signal muting pattern for a cell supported by the base station and activating the reference signal muting pattern in response to the request. In some embodiments the request for activation is received from another base station via a base station-to-base station interface. In others, the request for activation is received from a controlling node in the wireless communications network. As shown at blocks 1230 and 1240, a request to deactivate the reference signal muting pattern is subsequently received and the reference signal muting pattern is deactivated, in response.

Although not shown in FIG. 12, the illustrated operations may be preceded, in some embodiments, by the receiving of a request for synchronization information and responding with synchronization information that includes at least an indication that one or more reference signal muting patterns is/are available. The synchronization information may include an identification of one or more resources that are muted in at least a first reference signal muting pattern; this identification may comprise a subframe pattern, or a pattern periodicity, or both.

In some cases, the receiving of the message 1210 may trigger the receiving node to request activation of a reference signal muting pattern by one or more additional base stations and/or for one or more additional cells. Thus, in some embodiments, the method shown in FIG. 12 is extended by the sending of a message requesting activation of a reference signal muting pattern for a cell supported by a second base station, as shown at block 1225. This message is sent to the second base station, in some embodiments, or to a control node in the wireless communications network, in some others. The second base station may be selected based on an evaluation of its synchronization stratum level, in some embodiments, and/or based on an evaluation of its potential for interfering with one or more cells supported by the neighbor base station.

FIG. 13 illustrates a method, implemented in a control node operating in a wireless communications network, for facilitating over-the-air synchronization by a first base station with a first neighbor cell of a plurality of neighbor cells. As shown at block 1310, the method includes receiving a first message from the first base station, the first message indicating that reference signal muting by at least a second neighbor cell of the plurality of neighbor cells is needed. As shown at block 1320, the method continues the sending of a second message to at least a second base station corresponding to the second neighbor cell, the second message requesting activation of a reference signal muting pattern for the second neighbor cell.

In some embodiments, the first message does not identify the second neighbor cell and the method further comprises determining that a muting pattern should be activated for at least the second neighbor cell based on at least the identity of the requesting base station or its corresponding cell. This is shown at block 1315 in FIG. 13. In some of these embodiments, determining that a muting pattern should be activated for at least the second neighbor cell comprises determining that the second neighbor cell is an interferer to a cell corresponding to the requesting base station.

The illustrated method can be extended to facilitate the muting of reference signals for additional cells. Thus, in some embodiments, the method shown in FIG. 13 is extended by the sending of the second message or a corresponding message to at least a third base station corresponding to a third neighbor cell, such that the second message or corresponding message requests activation of a reference signal muting pattern for the third neighbor cell.

In one implementation-specific embodiment of the methods described above, the configuration of RIBS muting patterns at different RAN nodes is done in such a way that the patterns for two or more base stations share part or all of the muted resources. Namely, a configuration node such as the OAM system can configure RIBS muting patterns in different RAN nodes in a way that they will enable muting of all or a group of RAN nodes activating the patterns on at least a subset of muted resources. This is important because it allows interference reduction on at least a subset of resources even when more nodes are involved in activation of muting patterns.

In a variation, the coordination node may configure coordinated patterns (for example the same patterns) for all RAN nodes having the same stratum level. In this case, the RAN node grouping for muting patterns coordination purposes would be done on the basis of Stratum Level. Grouping of RAN nodes or cells for the purpose of assigning coordinated muting patterns can be done according to any of one or more different criteria, for example their maximum transmission powers, cell types (e.g. macro, micro, pico), etc.

In another implementation-specific embodiment of the first method described, a separate RIBS muting pattern activation message may not be needed for each node needed to activate muting patterns. Namely, a RAN node may be able to send a single RIBS muting pattern activation message to a single node. This message may trigger activation of muting patterns in multiple nodes. As an example, all the nodes activating muting patterns may share the same stratum level or may have stratum level equal or higher than a certain threshold.

For example, in the case of LTE, eNB1 may detect a number of interfering cells belonging to eNB2 and eNB3. eNB2 and eNB3 may have the same stratum level. In some embodiments, eNB1 may send a RIBS muting pattern activation request to eNB2. This may trigger activation of muting patterns on some or all of eNB2's cells, as well as on one or more of eNB3's cells. Such list of cells may be determined by considering the node requesting activation (e.g., by analyzing which cells are the strongest interferers to that node either at the node or via communication with another central node) and/or by considering the Stratum Level of the eNBs for which activation is triggered. The muting patterns activated at the same time may be coordinated, i.e. they may have some or all muted resources overlapping.

The latter method allows a reduction in the amount of signaling needed and simplifies activation procedures, while activating at the same time patterns that would drastically reduce the interference experienced by the requesting node.

In another implementation-specific embodiment of the first method described, a list of cells for which RIBS muting pattern activation/deactivation is requested may not be included in the message carrying the activation/deactivation request. The RAN node receiving the activation/deactivation request may automatically calculate the cells for which muting patterns should be activated by means of analyzing the requesting node and eventually the cell for which interference protection is requested. The node requested to activate/deactivate muting patterns may therefore calculate which cells are the strongest interferers for the requesting cell and by means of implementation enable/disable muting patterns on such cells. Alternately, the determination of the set of interferers may be done by another RAN node, in some embodiments.

Figure 14:
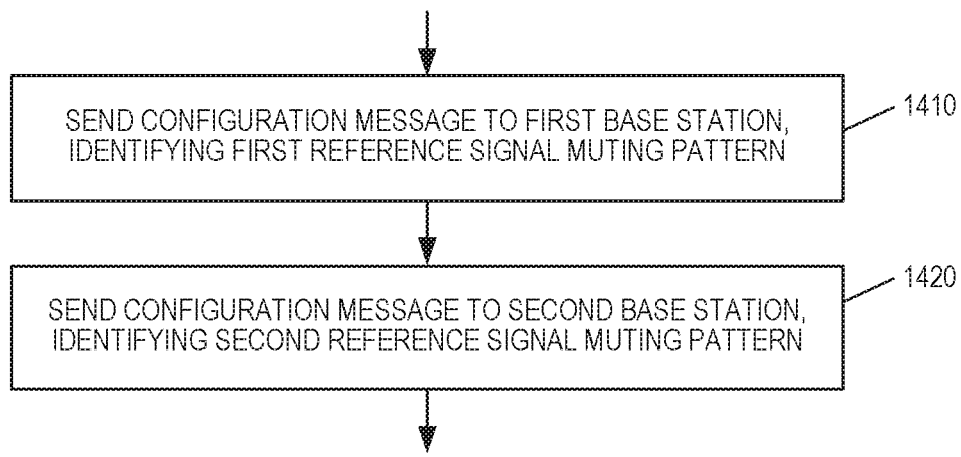
FIG. 14 is another process flow diagram illustrating an example method according to some of the disclosed techniques.

FIG. 14 illustrates yet another example method, in this case implemented in a control node operating in a wireless communications network, for facilitating over-the-air synchronization between base stations controlled by the control node. As shown at block 1410, the method includes sending a first configuration message to a first base station, the configuration message identifying a first reference signal muting pattern for use in a first cell corresponding to the first base station. As shown at block 1420, a second configuration message is sent to a second base station, the second configuration message identifying a second reference signal muting pattern for use in a second cell corresponding to the second base station. The first and second reference signal muting patterns comprise one or more common muted resources. In some embodiments, the first and second reference signal muting patterns have identical sets of muted resources.

In some embodiments, the method comprises sending a configuration message to each of three or more base stations, each configuration message identifying a reference signal muting pattern, and the identified reference signal muting patterns for the three or more base stations all comprise one or more common muted resources. In some of these embodiments, the method comprises sending a configuration message to each of a first set of base stations and to each of a second set of base stations, each configuration message identifying a reference signal muting pattern, wherein the identified reference signal muting patterns for the first set of base stations have a first set of muted resources in common and wherein the identified reference signal muting patterns for the second set of base stations have a second set of muted resources in common, the first and second sets of muted resources being different. In some of these embodiments, the first set of base stations includes only base stations having a first synchronization stratum level and the second set of base stations includes only base stations having a second synchronization stratum level, the first and second synchronization stratum levels being different.

Figure 15:
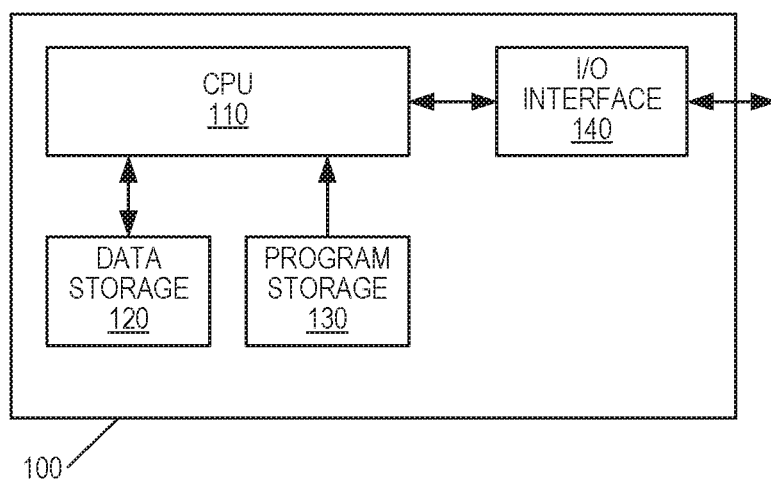
FIG. 15 illustrates components of an example base station or control node, according to various embodiments of the presently disclosed techniques and apparatus.

As discussed above, the several techniques described above may be implemented in a base station or other node, typically using a programmed processing node. FIG. 15 illustrates an example processing node 100, such as might be found in a base station or control node as discussed above. It will be appreciated that the processing circuits of FIG. 15, as detailed below, may correspond in whole or in part to the processing circuits illustrated in FIG. 7, for example.

A computer program for controlling the node 100 to carry out a method embodying any of the presently disclosed techniques is stored in a program storage 130, which comprises one or several memory devices. Data used during the performance of a method embodying the present invention is stored in a data storage 120, which also comprises one or more memory devices. During performance of a method embodying the present invention, program steps are fetched from the program storage 130 and executed by a Central Processing Unit (CPU) 110, retrieving data as required from the data storage 120. Output information resulting from performance of a method embodying the present invention, can be stored back in the data storage 120, or sent to an Input/Output (I/O) interface circuit 140, which may include a network interface for sending and receiving data to and from other network nodes. The CPU 110 and its associated data storage 120 and program storage 130 may collectively be referred to as a "processing circuit." It will be appreciated that variations of this processing circuit are possible, including circuits include one or more of various types of programmable circuit elements, e.g., microprocessors, microcontrollers, digital signal processors, field-programmable application-specific integrated circuits, and the like, as well as processing circuits where all or part of the processing functionality described herein is performed using dedicated digital logic.

Accordingly, in various embodiments of the invention, processing circuits, such as the CPU 110, data storage 120, and program storage 130 in FIG. 15, are configured to carry out one or more of the techniques described in detail above. Of course, it will be appreciated that not all of the steps of these techniques are necessarily performed in a single microprocessor or even in a single module.

It will also be appreciated that all of the details and variations discussed above in connection with the signal flow diagrams of FIGS. 9 and 10 and the process flow diagrams of FIGS. 11-14 may apply to various embodiments of the example nodes illustrated in FIG. 15.

Figure 16:
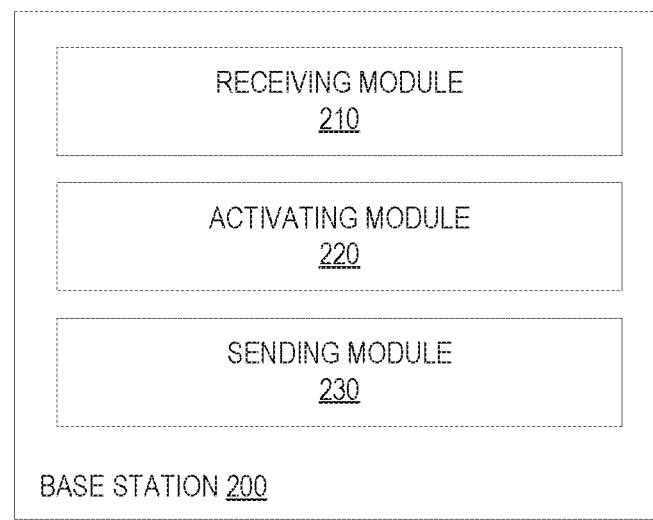
FIGS. 16, 17, and 18 are functional representations of an example base station and example control nodes, according to various embodiments of the presently disclosed techniques and apparatus.

It will further be appreciated that various aspects of the above-described above can be understood as being carried out by functional "modules," which may be program instructions executing on an appropriate processor circuit, hard-coded digital circuitry and/or analog circuitry, or appropriate combinations thereof. FIG. 16 illustrates an example base station 200, for example, which is configured for operation in a wireless communications network and to facilitate over-the-air synchronization with a neighboring base station. Base station 200, which may have a physical configuration like that of FIG. 7 and/or FIG. 15, for example, includes a receiving module 210 for receiving a request for activation of a reference signal muting pattern for a cell supported by the base station, as well as an activating module 220 for activating the reference signal muting pattern in response to the request. Base station 200 further includes a sending module 230 for sending a message requesting activation of a reference signal muting pattern for a cell supported by a second base station, in response to the request. The several variations described above in connection with the process flow diagram of FIG. 12 are particularly applicable to base station 200, which may comprise further modules corresponding to any of the other functional aspects of those variations.

Figure 17:
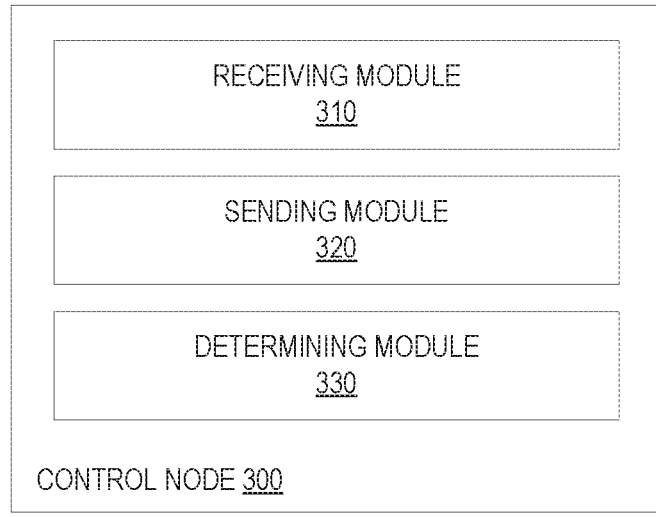

Similarly, FIG. 17 illustrates an example control node 300 that is configured for operating in a wireless communications network and to facilitate over-the-air synchronization among base stations. Control node 300 includes a receiving module 310 for receiving a first message from the first base station, the first message indicating that reference signal muting by at least a second neighbor cell of the plurality of neighbor cells is needed. Control node 300 further includes a sending module 320 for sending a second message to at least a second base station, corresponding to the second neighbor cell, the second message requesting activation of a reference signal muting pattern for the second neighbor cell. Control node 300 still further includes a determining module 330 for determining that a muting pattern should be activated for at least the second neighbor cell based on at least the identity of the first base station or the first cell, in response to the first message, wherein the first message does not identify the second neighbor cell. The several variations described above in connection with the process flow diagram of FIG. 13 are particularly applicable to control node 300, which may comprise further modules corresponding to any of the other functional aspects of those variations.

Figure 18:
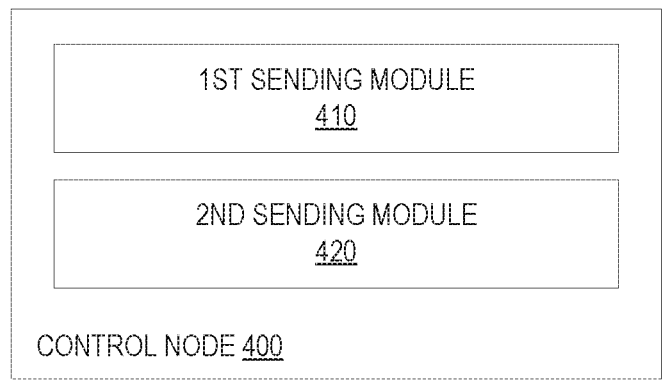

FIG. 18 illustrates another view of an example control node 400, which is also configured for operating in a wireless communications network and to facilitate over-the-air synchronization among base stations. Control node 400 includes a first sending module 410 for sending a first configuration message to a first base station, the configuration message identifying a first reference signal muting pattern for use in a first cell corresponding to the first base station. Control node 400 further includes a second sending module 420 for sending a second configuration message to a second base station, the second configuration message identifying a second reference signal muting pattern for use in a second cell corresponding to the second base station, wherein the first and second reference signal muting patterns comprise one or more common muted resources. The several variations described above in connection with the process flow diagram of FIG. 14 are particularly applicable to control node 400, which may comprise further modules corresponding to any of the other functional aspects of those variations.

Still further embodiments of the presently disclosed techniques and apparatus include computer program products comprising program instructions that, when executed by an appropriate processing circuit in a base station, control node, or the like, causes the node to carry out one or more of the methods described above. In some embodiments, any one or more of these computer program products may be embodied in a computer-readable medium, including a non-transitory medium such as a memory, recordable disc, or other storage device.

Examples of several embodiments of the present techniques have been described in detail above, with reference to the attached illustrations of specific embodiments, and are summarized in a listing below. Because it is not possible, of course, to describe every conceivable combination of components or techniques, those skilled in the art will appreciate that the present invention can be implemented in other ways than those specifically set forth herein, without departing from essential characteristics of the invention. The enumerated embodiments listed below and the illustrative embodiments discussed more generally above are thus to be considered in all respects as illustrative and not restrictive.

Example Embodiments

Following are non-limiting examples of embodiments according to the previously described techniques and apparatus. It will be appreciated, in view of the preceding discussion, that several variations of these embodiments are possible.

1. A method, in a base station operating in a wireless communications network, for facilitating over-the-air synchronization with a neighboring base station, the method comprising:
  determining that a first neighbor cell of a plurality of neighbor cells is a desired synchronization source;
  determining that a second neighbor cell of the plurality of neighbor cells is interfering with or is likely to interfere with a signal, from the first neighbor cell, that is used for synchronization; and
  sending, towards the second neighbor cell, a request for activation of a reference signal muting pattern by the second neighbor cell.

2. The method of embodiment 1, further comprising subsequently determining that the signal from the first neighbor cell is not needed or is unavailable for synchronization and, in response, sending a message, towards the second neighbor cell, indicating that the reference signal muting pattern may be deactivated.

3. The method of embodiment 1 or 2, wherein the request for activation is sent to a controlling node in the wireless communications network, wherein the controlling node controls a base station corresponding to the second cell.

4. The method of embodiment 1 or 2, wherein the request for activation is sent to a base station corresponding to the second cell.

5. The method of any of embodiments 1-4, wherein determining that the first neighbor cell is a desired synchronization source comprises receiving synchronization information from at least the first neighbor cell, the synchronization information indicating at least one of a stratum level and synchronization status, and evaluating the received synchronization information.

6. The method of any of embodiments 1-5, wherein determining that the first neighbor cell is a desired synchronization source is based at least in part on a signal strength of a signal received from the first neighbor cell.

7. The method of any of embodiments 1-6, further comprising receiving an indication of whether a reference signal muting pattern is available for the second neighbor cell, wherein said sending of the request is responsive to receiving said indication.

8. The method of embodiment 7, wherein the indication comprises or is associated with an identification of one or more muting patterns available for the second neighbor cell.

9. The method of any of embodiments 1-8, wherein the request for activation of the reference signal muting pattern includes a list of cells for which a muting pattern should be applied.

10. The method of any of embodiments 1-9, wherein the request for activation of the reference signal muting pattern includes an identification of one or more resources that should be muted.

11. The method of embodiment 10, wherein the identification of one or more resources that should be muted comprises a subframe pattern, or a pattern periodicity, or both.

12. The method of any of embodiments 1-11, further comprising performing synchronization based on the signal from the first neighbor cell.

13. The method of any of embodiments 1-12, further comprising receiving information identifying which resources are being muted or are to be muted by the second neighbor cell.

14. A method, in a base station operating in a wireless communications network, for facilitating over-the-air synchronization by a neighboring base station, the method comprising:
    receiving a request for activation of a reference signal muting pattern for a cell supported by the base station; and
    activating the reference signal muting pattern in response to the request.

15. The method of embodiment 14, further comprising subsequently receiving a request to deactivate the reference signal muting pattern and, in response, deactivating the reference signal muting pattern.

16. The method of embodiment 14 or 15, further comprising first receiving a request for synchronization information and responding with synchronization information that includes at least an indication that one or more reference signal muting patterns is/are available.

17. The method of embodiment 16, wherein the synchronization information comprises an identification of one or more resources that are muted in at least a first reference signal muting pattern.

18. The method of embodiment 17, wherein the identification of one or more resources that are muted comprises a subframe pattern, or a pattern periodicity, or both.

19. The method of any of embodiments 14-18, wherein the request for activation is received from another base station via a base station-to-base station interface.

20. The method of any of embodiments 14-18, wherein the request for activation is received from a controlling node in the wireless communications network.

21. The method of any of embodiments 14-20, further comprising sending a message requesting activation of a reference signal muting pattern for a cell supported by a second base station.

22. The method of embodiment 21, wherein the message is sent to the second base station.

23. The method of embodiment 21, wherein the message is sent to a control node in the wireless communications network.

24. The method of any of embodiments 21-23, further comprising selecting the second base station based on an evaluation of its synchronization stratum level.

25. The method of any of embodiments 21-24, further comprising selecting the second base station based on an evaluation of its potential for interfering with one or more cells supported by the neighbor base station.

26. A base station apparatus comprising a transceiver circuit configured to communicate with one or more mobile stations and an communications interface circuit configured to communicate with one or more other base stations or with one or more control nodes, or one or more of each, the base station apparatus further comprising a processing circuit configured to control the transceiver circuit and the communications interface circuit and further configured to carry out any one or more of the methods of embodiments 1-25.

27. A method, in a control node operating in a wireless communications network, for facilitating over-the-air synchronization by a first base station with a first neighbor cell of a plurality of neighbor cells, the method comprising:
    receiving a first message from the first base station, the first message indicating that reference signal muting by at least a second neighbor cell of the plurality of neighbor cells is needed; and
    sending a second message to at least a second base station corresponding to the second neighbor cell, the second message requesting activation of a reference signal muting pattern for the second neighbor cell.

28. The method of embodiment 27, further comprising sending the second message or a corresponding message to at least a third base station corresponding to a third neighbor cell, such that the second message or corresponding message requests activation of a reference signal muting pattern for the third neighbor cell.

29. The method of embodiment 27, wherein the first message does not identify the second neighbor cell and wherein the method further comprises determining that a muting pattern should be activated for at least the second neighbor cell based on at least the identity of the requesting base station or its corresponding cell.

30. The method of embodiment 29, wherein determining that a muting pattern should be activated for at least the second neighbor cell comprises determining that the second neighbor cell is an interferer to a cell corresponding to the requesting base station.

31. A method, in a control node operating in a wireless communications network, for facilitating over-the-air synchronization between base stations controlled by the control node, the method comprising:
    sending a first configuration message to a first base station, the configuration message identifying a first reference signal muting pattern for use in a first cell corresponding to the first base station; and
    sending a second configuration message to a second base station, the second configuration message identifying a second reference signal muting pattern for use in a second cell corresponding to the second base station, wherein the first and second reference signal muting patterns comprise one or more common muted resources.

32. The method of embodiment 31, wherein the first and second reference signal muting patterns have identical sets of muted resources.

33. The method of embodiment 31 or 32, wherein the method comprises sending a configuration message to each of three or more base stations, each configuration message identifying a reference signal muting pattern, and wherein the identified reference signal muting patterns for the three or more base stations all comprise one or more common muted resources.

34. The method of embodiment 33, wherein the method comprises sending a configuration message to each of a first set of base stations and to each of a second set of base stations, each configuration message identifying a reference signal muting pattern, wherein the identified reference signal muting patterns for the first set of base stations have a first set of muted resources in common and wherein the identified reference signal muting patterns for the second set of base stations have a second set of muted resources in common, the first and second sets of muted resources being different.

35. The method of embodiment 34, wherein the first set of base stations includes only base stations having a first synchronization stratum level and the second set of base stations includes only base stations having a second synchronization stratum level, the first and second synchronization stratum levels being different.

36. A control node apparatus comprising a communications interface circuit configured to communicate with a plurality of base stations, the control node apparatus further comprising a processing circuit configured to control the communications interface circuit and further configured to carry out any of the methods of embodiments 27-35.

What is claimed is:

1. A method, in a base station operating in a wireless communications network, for over-the-air synchronization with a cell served by a further base station, the method comprising:
   receiving time synchronization information and muting availability information associated with a plurality of further base stations serving a plurality of cells;
   determining that a cell served by a first further base station is a preferred synchronization source cell for the base station; and
   sending, to one or more second further base stations, respective requests to activate muting in one or more of the cells served by the second further base stations.

2. The method of claim 1, wherein:
   the time synchronization information, associated with each further base station, includes a synchronization stratum level; and
   determining that the cell is a preferred synchronization source cell is based on the respective synchronization stratum levels of the plurality of further base stations.

3. The method of claim 2, further comprising:
   determining a need for muting one or more reference signals (RS), associated with cells other than the preferred synchronization source cell, to facilitate synchronization with the preferred synchronization source cell; and
   selecting the one or more cells based on the determined need for muting and the muting availability information associated with the second further base stations.

4. The method of claim 3, wherein determining the need for muting is based on an evaluating potential for the one or more RS to interfere with the preferred synchronization source cell.

5. The method of claim 1, wherein muting availability information, for each further base station, indicates that reference signal (RS) muting patterns are available for activation by the base station.

6. The method of claim 1, wherein each request to activate muting includes at least one of the following:
   an identity of a second further base station;
   identities of one or more cells needing to be muted;
   identities of one or more first RS muting patterns requested for the identified cells; and
   a value for activating muting in the identified cells.

7. The method of claim 6, wherein each first RS muting pattern includes one or more of the following: a subframe muting pattern and a pattern periodicity.

8. The method of claim 6, further comprising receiving, from the one or more second further base stations, respective responses to the requests to activate muting, each response including:
   identities of one or more cells that have been or will be muted; and
   identities of one or more second RS muting patterns that have been or will be activated for the identified one or more cells.

9. The method of claim 8, wherein the one or more second RS muting patterns are different from the one or more first RS muting patterns.

10. The method of claim 8, further comprising, based on the respective responses, performing synchronization with the cell served by a first further base station.

11. The method of claim 8, further comprising sending, to at least a portion of the second further base stations, respective requests to deactivate muting in one or more of the cells, each request including at least one of the following:
    identities of one or more cells for which muting can be deactivated; and
    a value for deactivating muting in one or more cells in which muting is activated.

12. A method, in a further base station operating in a wireless communications network, for facilitating over-the-air synchronization by a first base station, the method comprising:
    sending, to the first base station, time synchronization information and muting availability information associated with the further base station;
    receiving, from the first base station, a request to activate muting in one or more cells served by the further base station; and
    selectively activating muting in the one or more cells based on the request and on current traffic conditions in the one or more cells.

13. The method of claim 12, wherein:
    the muting availability information indicates that reference signal (RS) muting patterns are available for activation by the further base station; and
    the time synchronization information includes a synchronization stratum level for the further base station.

14. The method of claim 12, wherein the request to activate muting includes at least one of the following:
    an identity of the further base station;
    identities of one or more cells needing to be muted;
    identities of one or more first RS muting patterns requested for the identified cells; and
    a value for activating muting in the identified cells.

15. The method of claim 14, wherein each first RS muting pattern includes one or more of the following: a subframe muting pattern and a pattern periodicity.

16. The method of claim 14, wherein selectively activating muting in the one or more cells comprises selecting one or more second RS muting patterns for activation in the one or more cells based on:
the first RS muting patterns;
synchronization status of the one or more cells; and
traffic conditions in the one or more cells.

17. The method of claim 16, wherein the one or more second RS muting patterns are different from the one or more first RS muting patterns.

18. The method of claim 14, further comprising sending, to the first base station, a response to the requests to activate muting, the response including:
identities of one or more cells that have been or will be muted; and
identities of one or more second RS muting patterns that have been or will be activated for the identified one or more cells.

19. The method of claim 12, further comprising receiving, from the first base station, a request to deactivate muting in one or more cells, the request including at least one of the following:
identities of one or more cells for which muting can be deactivated; and
a value for deactivating muting in one or more cells in which muting is activated.

20. A base station apparatus comprising:
a communications interface circuit configured to communicate with a plurality of further base stations in a wireless communication network; and
a processing circuit configured to control the communications interface circuit and further configured to perform operations corresponding to the method of claim 1.

21. A base station apparatus comprising
a communications interface circuit configured to communicate with at least a first base station in a wireless communication network; and
a processing circuit configured to control the communications interface circuit and further configured to perform operations corresponding to the method of claim 12.

* * * * *